United States Patent
Li (10) Patent No.: US 11,526,606 B1
(45) Date of Patent: Dec. 13, 2022

(54) CONFIGURING MACHINE LEARNING MODEL THRESHOLDS IN MODELS USING IMBALANCED DATA SETS

(71) Applicant: INTUIT INC., Mountain View, CA (US)

(72) Inventor: Mu Li, Redwood City, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 17/854,279

(22) Filed: Jun. 30, 2022

(51) Int. Cl.
*G06F 21/55* (2013.01)
*G06K 9/62* (2022.01)
*G06N 20/00* (2019.01)

(52) U.S. Cl.
CPC .......... *G06F 21/554* (2013.01); *G06F 21/552* (2013.01); *G06K 9/6224* (2013.01); *G06K 9/6265* (2013.01); *G06N 20/00* (2019.01)

(58) Field of Classification Search
CPC ... G06F 21/554; G06F 21/552; G06K 9/6224; G06K 9/6265; G06N 20/00
See application file for complete search history.

(56) References Cited

U.S. PATENT DOCUMENTS

| 2018/0018587 | A1* | 1/2018 | Kobayashi | G06N 5/04 |
| 2020/0067861 | A1* | 2/2020 | Leddy | G06F 21/6245 |
| 2020/0097853 | A1* | 3/2020 | Golovin | G06N 3/08 |
| 2021/0065052 | A1* | 3/2021 | Muralidharan | G06N 3/082 |

FOREIGN PATENT DOCUMENTS

WO WO-2021195689 A1 * 10/2021 ............. G06N 20/00

* cited by examiner

*Primary Examiner* — Darren B Schwartz
(74) *Attorney, Agent, or Firm* — Patterson + Sheridan, LLP (57) ABSTRACT

Certain aspects of the present disclosure provide techniques for efficiently configuring a machine learning model. An example method generally includes generating a randomly sampled data set from a data set including a larger first set of samples associated with a first classification and a smaller second set of samples associated with a second classification. An analysis plot for the machine learning model is generated based on the randomly sampled data set. A point associated with an accuracy metric for the machine learning model is identified on the analysis plot based on a slope of a line tangential to the identified point and a value identifying a relative importance of precision to recall in the machine learning model. The machine learning model is configured with a threshold value between the first classification and the second classification based at least in part on the identified point on the analysis plot.

19 Claims, 4 Drawing Sheets

CONFIGURING MACHINE LEARNING MODEL THRESHOLDS IN MODELS USING IMBALANCED DATA SETS

INTRODUCTION

Aspects of the present disclosure relate to machine learning models, and more specifically to configuring machine learning models used with imbalanced data sets.

BACKGROUND

Machine learning models are used in many tasks, such as security, fraudulent activity detection, anomaly detection, and others. In many of these tasks, these machine learning models can classify input data into one of a number of classifications (or labels or categories). For example, in security applications, an input (e.g., of activity recorded within a software application) may be classified as safe activity or malicious activity. In another example, in anomaly detection systems used to determine whether input data and the devices from which the input data is obtained is operating normally or abnormally.

Data sets used to train machine learning models may be highly imbalanced. Generally, an imbalanced training data set refers to a training set in which the proportion of exemplars for each output classification is significantly different. For example, in a security application, a significant proportion of training inputs (e.g., >90%) may represent safe activity (a model output classification) that does not impose security threats to computing systems presented by the security application, and a smaller proportion of training inputs (e.g., <10%) may represent malicious activity (another model output classification), such as attempts to exfiltrate data from a protected computing environment, execute malicious software on systems in a computing environment, or the like. In another example, in a transaction processing system, the vast majority of transactions processed by transaction processing system may be legitimate transactions conducted by or on behalf of a party named in the transaction, and only a small number of inputs may represent fraudulent transactions in which a malicious party is trying to perform a transaction using some other party's information (e.g., username, password, payment details, etc.).

For a binary classification problem solved by a machine learning model, a threshold value may be established to define a threshold by which an input is assigned to a first classification or a second classification, such as based on an output value of the machine learning model. In the security application discussed above, this threshold value may represent a value above which an input is classified as safe activity and below which an input is classified as malicious activity (or vice versa) based on the output value of the model. In the transaction processing system discussed above, this threshold value may represent a value above which an input is classified as a legitimate transaction and below which an input is classified as a fraudulent transaction (or vice versa) based on the output value of the model. However, because the data sets involved in these applications may be highly imbalanced, selecting the threshold value may be technically challenging, and may result in decreased precision in classifying inputs into one of the two categories in a binary classification problem. Further, selection of the wrong threshold value may negatively impact the accuracy of the machine learning model, and thus may result in a substantial numbers of false positives (e.g., classifying negative events, such as malicious activity or fraudulent transactions, as positive events) and/or false negatives (e.g., classifying positive events, such as normal activity or legitimate transactions, as negative events). Accordingly, there are extant technical problems with determining model output value thresholds that decrease the performance of various types of machine learning models trained to perform tasks based on imbalanced training data sets.

Thus, techniques are needed for configuring machine learning models with thresholds that allow for accurate inference in scenarios in which data is highly imbalanced.

BRIEF SUMMARY

Certain embodiments provide a computer-implemented method for configuring a machine learning model. An example method generally includes generating a randomly sampled data set from a data set including a first set of samples associated with a first classification and a second set of samples associated with a second classification. The number of samples in the first set of samples is generally larger than a number of samples in the second set of samples. An analysis plot for the machine learning model is generated based on the randomly sampled data set. A point associated with an accuracy metric for the machine learning model is identified based on the analysis plot based on a slope of a line tangential to the identified point and a value identifying a relative importance of precision to recall in the machine learning model. The machine learning model is configured with a threshold value between the first classification and the second classification based at least in part on the identified point on the analysis plot.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

In various applications, machine learning models may be used to classify inputs into one of a plurality of classifications. As discussed, these classifications may be used for various purposes, such as monitoring for and allowing or disallowing activity in a computing system (e.g., when activity is classified as non-malicious activity or malicious activity), allowing or blocking completion of transactions, or other purposes based on classification of an input using a binary classifier. However, in the real world, a training data set of inputs for training such models may include a higher proportion of inputs having a first classification (also referred to as a "majority class") and a lower proportion of inputs having a second classification (also referred to as a "minority class"). For example, in a computer security system, normal activity, such as accessing unprotected resources or accessing protected resources for which access permission has already been granted may be very common activity recorded within the computer security system; however, abnormal activity, such as exfiltration of data using advanced persistent threats (APTs), download and execution of malicious software, repeated attempts to guess a user's password in order to access protected resources, or the like may be a rare occurrence. In this example, normal activity may correspond to the majority class, and abnormal activity may correspond to the minority class.

In identifying a threshold between the majority class and the minority class in the machine learning model, a precision-recall curve may be generated illustrating the tradeoff between precision, or the ratio between true positive classifications and false positive classifications, and recall, or the ratio between true positive classifications and the sum of true positive and false negative classifications. For a machine learning model trained using an imbalanced data set, the precision-recall curve may fluctuate directionally (e.g., rapidly change between positive and negative changes), and thus, it may be difficult to find an optimal threshold that optimizes the tradeoff between precision and recall in the machine learning model. This threshold generally is a value that is compared against an output value of a machine learning model to determine the category associated with an input (e.g., to assign a label or classification to an input). For example, in a machine learning model trained as a binary classifier to classify data into a first classification or a second classification (e.g., to anomalous or non-anomalous activity in a computing system, to normal or malicious activity in a security system, etc.), outputs of a machine learning model below the threshold may be associated with the first classification and outputs above the threshold may be associated with the second classification.

To address model performance for data in the minority class, various sampling techniques may be used to rebalance the distribution of data between the majority and minority classes within the data set. While sampling a highly imbalanced data set to rebalance the distribution of data between the majority and minority classes (or between any number of classes) may allow for a usable precision-recall curve to be generated for the machine learning model, identifying the threshold based on this precision-recall curve may be a computationally expensive process. Generally speaking, such a process is not feasibly performed manually and or by a human, and requires significant processing power to practically consider a wide range of options.

Aspects of the present disclosure provide techniques that allow for the rapid configuration of thresholds for assigning classifications to input data from outputs of a machine learning model in which the machine learning model is trained using an imbalanced data set. As discussed in further detail herein, an imbalanced data set may be randomly sampled to rebalance the distribution of data between the majority and minority classes (or between any number of classes) such that the proportion of the randomly sampled data set belonging to the minority class is larger than the proportion of the original data set belonging to the minority class. An analysis curve, such as a precision-recall-gain curve or other curve with monotonic characteristics, is generated for the machine learning model based on the randomly sampled data set and a threshold for assigning a classification to an input based on an output value generated by a machine learning model is selected based on an identification of a point on the analysis curve having a specified slope. Because the analysis curve may monotonically increase or decrease (e.g., increases in values along a first axis will be met by a change in the same direction along a second axis, so that the value on the second axis always increases or always decreases), aspects of the present disclosure may accelerate the identification of a threshold for the machine learning model relative to a search for a threshold performed on a curve that does not monotonically increase or decrease. Further, the threshold may be associated with a desired tradeoff between precision and recall so that the machine learning model may be rapidly configured with a threshold between a majority class and a minority class that reflects this desired tradeoff between precision and recall.

Example Configuration of Thresholds for Machine Learning Models

Figure 1:
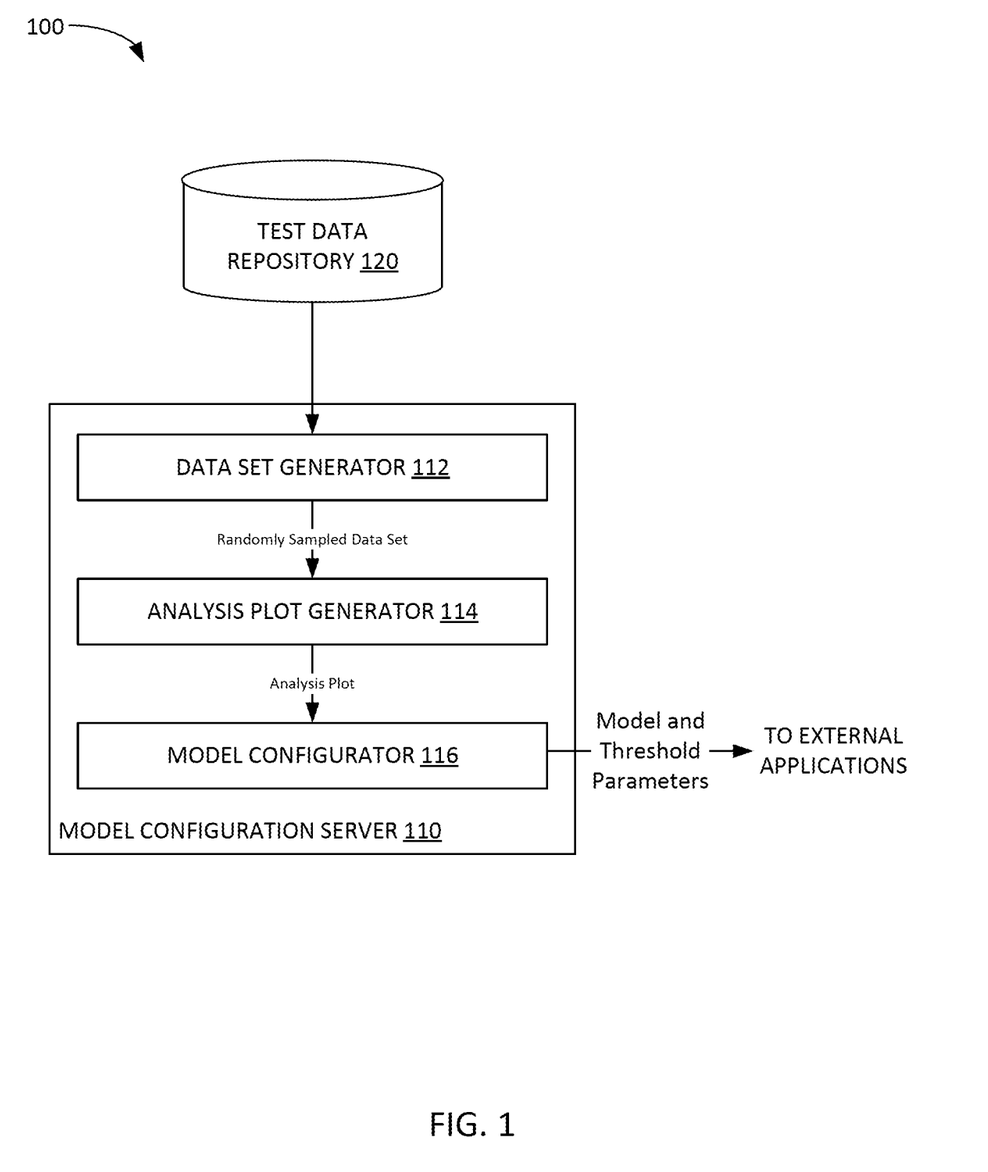
FIG. 1 depicts an example computing environment in which a machine learning model is configured with a threshold between a first classification and a second classification based on a sampled data set.

FIG. 1 illustrates an example computing environment 100 in which a trained machine learning model is configured with a threshold between a first classification and a second classification based on an analysis plot generated using a randomly sampled data set. As illustrated, computing environment 100 includes a server 110 and a test data repository 120.

Server 110 generates a randomly sampled data set from a source data set and uses the randomly sampled data set to generate analysis plots for use in identifying a threshold for a trained machine learning model that optimizes a tradeoff between model precision and model recall. Server 110 may be any of a variety of computing devices that can generate training data sets and train predictive models based on these training data sets, such as a server computer, a cluster of computers, cloud computing instances, or the like. As illustrated, server 110 includes a data set generator 112, analysis plot generator 114, and model configurator 116.

Data set generator 112 is configured to generate a randomly sampled data set from a source data set retrieved from test data repository 120. In some aspects, the source data set may be defined as a set of inputs, with each respective input being associated with a prediction score and a ground-truth label for that respective input, which may allow for the analysis plot to be generated, as different threshold values for the prediction score may cause the respective input to be incorrectly classified based on the prediction score associated with the respective input. The source data set retrieved from test data repository 120 may include a first set of samples associated with a first classification (e.g., data in a majority class) and a second set of samples associated with a second classification (e.g., data in a minority class). Generally, the source data set may be imbalanced such that the proportion of samples in the first set of samples relative to the source data set is significantly larger than the proportion of samples in the second set of samples relative to the source data set. For example, in a computer security application, the first set of samples may be associated with non-malicious activity within a computing system, while the second set of samples may be associated with malicious activity within the computing system. Because non-malicious activity may be significantly more common than malicious activity within the computing system, the ratio of non-malicious activity to malicious activity may be on the order of 1000:1 or even larger ratios.

Thus, to generate the randomly sampled data set from the source data set, data set generator 112 can reduce the number of samples in the first set of samples or increase the number of samples in the second set of samples. In some aspects, in generating the randomly sampled data set, the ratio between a number of samples associated with the first classification and a number of samples associated with the second classification in the randomly sampled data set is reduced from the ratio in the source data set to a defined ratio.

In one aspect, to generate the randomly sampled data set, the first set of samples may be randomly sampled to reduce the number of samples associated with the first classification to a number smaller than the number of samples associated with the first classification in the source data set. For example, in randomly sampling the first set of samples, every $n^{th}$ sample can be selected from the set of samples associated with the first classification in the source data set until a threshold number of samples is reached.

In another aspect, to generate the randomly sampled data set, the second set of samples may be oversampled to increase the number of samples associated with the second classification to a number larger than the number of samples associated with the second classification in the source data set. To oversample the second set of samples, multiple copies of samples in the second set of samples may be generated to increase the size of the second set of samples in the randomly sampled data set. In another example, to oversample the second set of samples, synthetic samples may be generated based on statistical measures between different samples in the second set of samples. For example, a synthetic sample may be generated with attributes that are calculated as averages between the attributes associated with any number of randomly selected samples in the second set of samples. Generally, because the attributes generated for any synthetic sample may be based on the values of attributes from samples assigned to the second set of samples, the synthetic sample should also be assigned to the second set of samples. In another example, synthetic samples may be generated by applying random modifications to randomly selected samples in the second set of samples. These random modifications may, for example, be bounded by minimum and maximum values for each attribute of samples in the second set of samples so that the synthetic samples contain values for attributes that are similar to the values of attributes associated with samples known to be assigned to the second classification using the machine learning model.

After data set generator 112 generates the randomly sampled data set, analysis plot generator 114 generates an analysis plot based on the randomly sampled data set. In some aspects, the analysis plot may be a plot with a monotonic characteristic such that values in the analysis plot always move in one direction (e.g., such that increases in values on a first axis are always correlated with increases in values on a second axis or decreases in values on the second axis) In such a case, the analysis plot may be generated as a precision-recall-gain (PRG) curve with a convex hull representing a smallest area in the analysis plot containing raw PRG values for each pair of precision gain and recall gain values generated by analysis plot generator 114 for the randomly sampled data set. A PRG curve conveys an expected F score (i.e., a harmonic mean calculated between precision and recall for any given threshold value), and the convex hull of the PRG curve generally allows for the calibration of classifier threshold scores so as to determine, for each operating point on the convex hull, the interval of $\beta$ values for which the point optimizes $F_\beta$. Generally, $\beta$ represents the relative importance of precision to recall selected for a machine learning model. $\beta=1$ may equally weight precision and recall, while larger values of $\beta$ may assign a higher weight to recall and smaller values of $\beta$ may a higher weight to precision. In some aspects, $\beta$ may be a user-defined parameter for the model which may reflect user preferences for precision over recall, recall over precision, or an equal weighting between precision and recall.

Model configurator 116 uses the analysis curve generated by analysis plot generator based on the randomly sampled data set and identifies a threshold to use in determining whether the output of a machine learning model should result in the input being assigned the first classification or the second classification. This identified threshold generally results in optimized inference performance for the machine learning model and a given data set for a given value of $\beta$ To identify the threshold between the first classification and the second classification, model configurator 116 identifies a point on the analysis curve associated with the threshold based on the slope of a line tangential to the identified point and a defined value of $\beta$ (which, as discussed above, represents the relative importance of precision to recall in the machine learning model). In some aspects, this point may be defined as the point on the analysis curve at which the slope of the line tangential to the identified point equals $-\beta^2$, as this location may be the location at which the $F_\beta$ score is optimized. That is, the slope of the line may be the negative of the square of the value that identifies the relative importance of precision to recall in the machine learning model.

In some aspects, to identify the threshold, a binary search can be performed to identify the point on the analysis curve at which the slope of the line tangential to the point equals $-\beta^2$. Generally, a binary search may be a process in which the search space for an ordered set of data is halved with each round of searching until a matching value is found. A binary search may be used, instead of an exhaustive search of the analysis curve, because the analysis plot may have a convex, monotonic form in which the analysis curve has a defined point at which the slope of the line decreases significantly. That is, the slope of the line may have an increasing, asymptotic magnitude as the amount of gain for one parameter increases, as increasing the gain for one parameter may cause a corresponding decrease in the gain for the other parameter. For such an analysis curve, the slope may be close to 0 when precision is the only parameter considered in setting a threshold value for the machine learning model, and the slope may asymptotically decrease to negative infinity as the relative importance of recall increases over precision.

In other words, the analysis curve may reflect an ordered data set in which each pair of precision gain and recall gain values are associated with a slope of a line, and the pairs of precision gain and recall gain values or ordered from the largest slope to the smallest slope (e.g., from 1 to −∞). Because the analysis curve reflects an ordered data set, an exhaustive search need not be performed in order to identify the threshold. Rather, a search may be performed by initially selecting the midpoint of the analysis curve. From this midpoint, model configurator 116 can determine whether the slope of the line tangential to the midpoint is greater than $-\beta^2$ or less than $-\beta^2$. If the slope of the line tangential to the midpoint is greater than $-\beta^2$, then the search space may be narrowed by half, to points on the analysis curve having tangential lines with slopes greater than $-\beta^2$. Similarly, if the slope of the line tangential to the midpoint is less than $-\beta^2$, the search space may be narrowed by half, to points on the analysis curve having tangential lines with slopes smaller than $-\beta^2$. This process may be repeated until a model configurator 116 finds a point on the analysis curve with a tangential line having a slope that equals $-\beta^2$.

Because a binary search can be used to identify the threshold, aspects of the present disclosure may accelerate the process of identifying the threshold relative to using an exhaustive search over a precision-recall curve. An exhaustive search over a precision-recall curve may be a process that can be completed in O(n) time. In contrast, the binary search over the PRG curve discussed herein may be a process that can be completed in O(log n) time, which allows for the threshold to be identified in a significantly smaller amount of time than would be needed to perform an exhaustive search over a precision-recall curve.

After identifying the threshold, model configurator 116 can output the identified threshold value to devices (not pictured) on which the machine learning model is deployed. Model configurator 116 may thus configure the devices on which the machine learning model is deployed with the appropriate threshold value between the first classification and the second classification that results in a desired tradeoff between precision and recall in the machine learning model.

In some aspects, model configurator 116 can calculate $F_\beta$ scores across different data sets on which a machine learning model may be used to generate inferences. An $F_\beta$ score generally represents a harmonic mean between precision and recall for a machine learning model, given a defined threshold associated with a value of β. The $F_\beta$ score generated for each data set generally allows for model configurator 116 to determine model performance (e.g., classification accuracy) for different data sets. If the $F_\beta$ score for a given data set indicates that the machine learning model (and the configured threshold) has poor inference performance for that data set, model configurator 116 can perform various actions to improve the performance of the model for that data set. For example, model configurator 116 can adjust the threshold so that a different threshold value is used for assigning an input to the first classification or the second classification.

Figure 2:
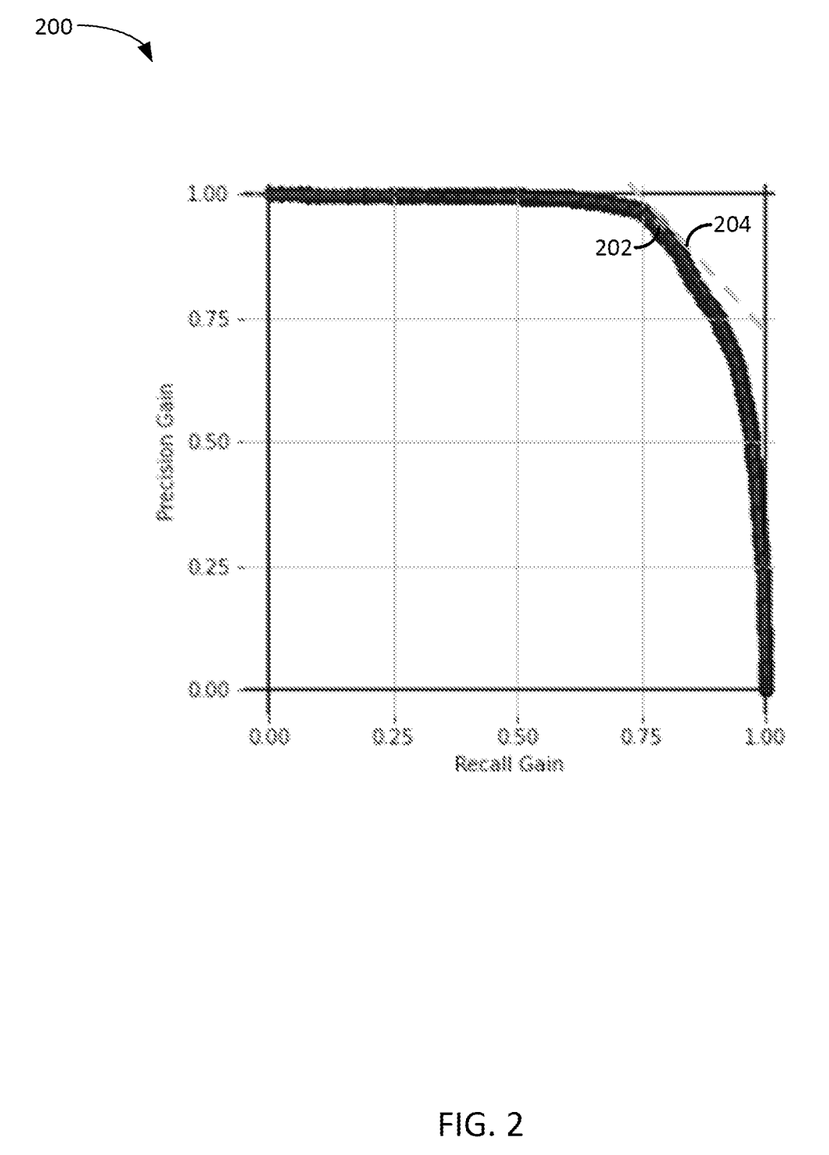
FIG. 2 illustrates an example of identifying a threshold between a first classification and a second classification using an analysis curve generated for a data set.

Example Identification of a Threshold for Classifying Data Using an Analysis Curve FIG. 2 illustrates an example of identifying, using an analysis curve, a threshold value to use to determine a classification for an input to a machine learning model based on the output of a machine learning model for that given input. As illustrated, a point 202 is identified on analysis curve 200 for a given value of β based on the slope of the line tangential to different points on analysis curve 200 in order to identify the threshold value for determining which classification to assign to the output of a machine learning model.

In this example, we assume that Θ=1, and thus, the slope of the line tangential to a point on analysis curve 200 is −1. Slopes of lines tangential to points on analysis curve 200 greater than −1 may result in the selection of a threshold score that optimizes precision at the expense of recall. Meanwhile slopes of lines tangential to points on analysis curve 200 less than −1 may result in the selection of a threshold score that optimizes recall at the expense of precision.

To identify the point 202 at which the slope of the tangential line 204 is equal to $-\beta^2$, the slope of the tangential line to the midpoint of analysis curve 200 may first be determined. In this example, for a recall gain spanning 0 through 1, the initial point for analysis may be selected as the point at which recall gain equals 0.5 (i.e., the midpoint between 0 and 1). In this case, the slope of the tangential line on analysis curve 200 at this point is greater than −1; thus, using a binary search algorithm, no further searching needs to be performed on the points on the analysis curve having recall gain values less than 0.5. A subsequent round of analysis may thus be performed on the midpoint of values between 0.5 and 1.0. In this case, it may still be seen that the slope of the line tangential to the point on analysis curve 200 where recall gain equals 0.75 (i.e., the midpoint between 0.5 and 1) is greater than −1.

Thus, using a binary search algorithm, the next round of searching may focus on the region of the analysis curve between recall gain values of 0.75 and 1.0, with the midpoint value of 0.875 being selected as the point at which the slope of the line tangential to the analysis curve 200 is calculated. In this case, the slope of the line tangential to the analysis curve 200 where the recall gain value equals 0.875 is less than −1. Thus, the binary search algorithm may narrow the search area for finding the point 202 that corresponds to an optimal threshold score to points on the analysis curve between recall gain values of 0.75 and 0.875. This process generally continues, dividing the search space in half with each round of searching, until point 202 is identified.

Example Methods for Configuring Thresholds for Machine Learning Models

Figure 3:
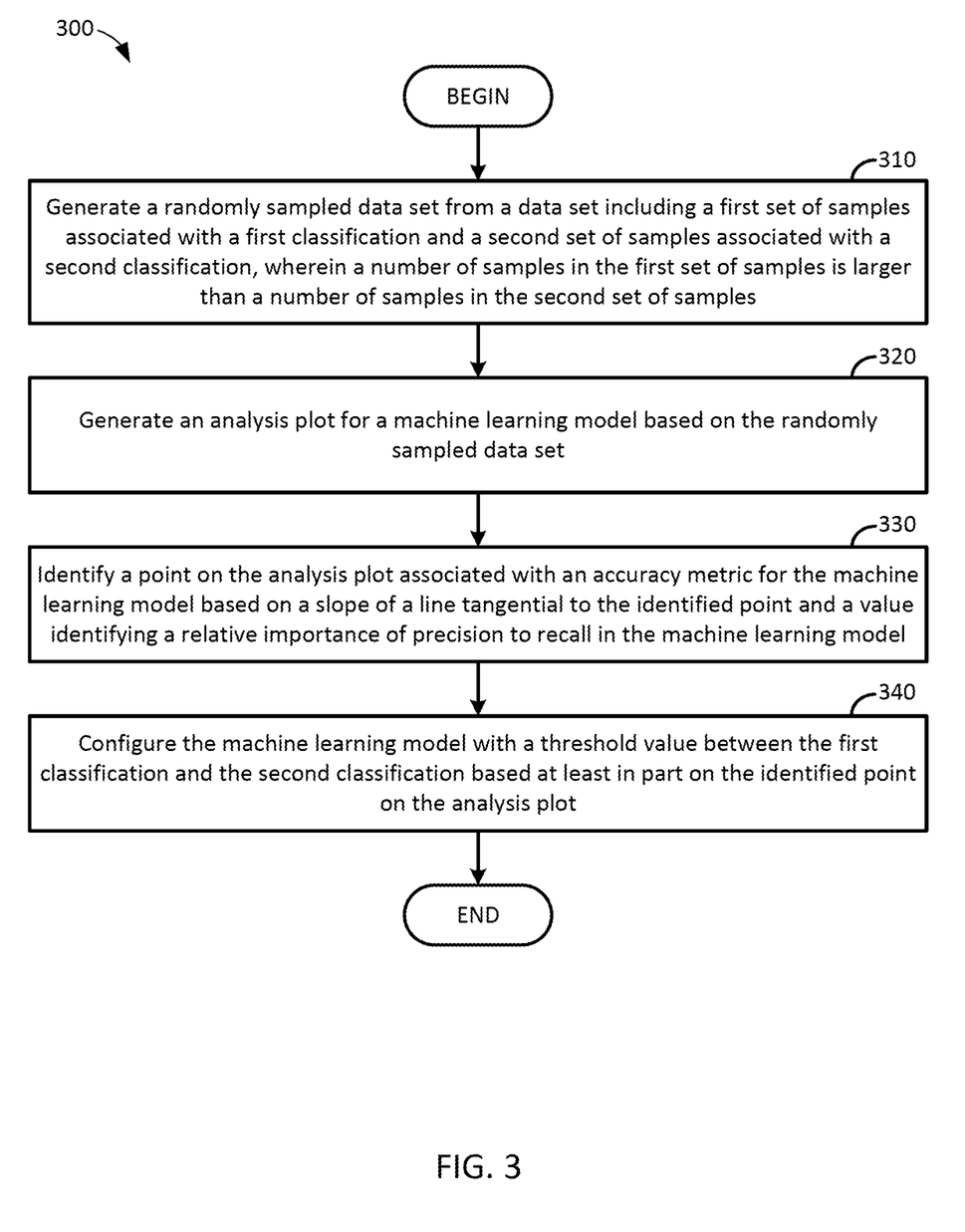
FIG. 3 illustrates example operations for configuring a machine learning model with a threshold between a first classification and a second classification based on a sampled data set.

FIG. 3 illustrates example operations 300 that may be performed to configure thresholds for classifying data into a first classification or second classification using a machine learning model, in accordance with aspects of the present disclosure. Operations 300 may be performed, for example, by data set generator 112, analysis plot generator 114, and/or model configurator 116 of server 110 illustrated in FIG. 1 or other computing devices on which model performance for various data sets can be analyzed.

As illustrated, operations 300 begin at block 310 with generating a randomly sampled data set from a data set. In some aspects, the data set may include a prediction score generated by a machine learning model and a ground-truth label associated with each sample in a database (e.g., test data store 120 illustrated in FIG. 1), which allows for precision and recall metrics to be calculated for any threshold value on an analysis curve for each sample. The data set generally includes a first set of samples associated with a first classification and a second set of samples associated with a second classification. As discussed, the data set may be imbalanced, with the proportion of the first set of samples to the number of samples in the data set being significantly larger than the proportion of the second set of samples to the number of samples in the data set. In some aspects, the first set of samples may be associated with a negative classification for a defined task which the machine learning model is trained to perform, and the second set of samples may be associated with a positive classification for the defined task. For example, for a machine learning model used in identifying legitimate or fraudulent activity in a computing system, the negative classification may correspond to legitimate activity within the computing system, and the positive classification may correspond to fraudulent activity within the computing system. In another example, for a machine learning model used in determining whether activity in a computing system corresponds to normal activity or a security threat, the negative classification may correspond to normal activity within the computing system, while the positive classification may correspond to activity that is likely to be a security threat to the computing system.

Generally, in generating the randomly sampled data set, the ratio of the number of samples in the first set of samples in the randomly sampled data set to the number of samples in the second set of samples in the randomly sampled data set may be reduced to a defined level that is smaller than the ratio of the number of samples in the first set of samples in the source data set to the number of samples in the second set of samples in the source data set. In some aspects, to generate the randomly sampled data set, the first set of samples in the source data set may be sampled to reduce a number of samples associated with the first classification in the randomly sampled data set to a number smaller than the number of samples in the first set of samples. In some aspects, to generate the randomly sampled data set, the second set of samples in the source data set may be oversampled such that a number of samples in the randomly sampled data set associated with the second classification is greater than the number of samples in the second set of samples.

At block 320, operations 300 proceed with generating an analysis plot for a machine learning model based on the randomly sampled data set. In some aspects, the analysis plot may be an analysis curve, such as a precision-recall-gain (PRG) curve, or other curve having monotonic characteristics.

At block 330, operations 300 proceed with identifying a point on the analysis plot associated with an accuracy metric for the machine learning model based on a slope of a line tangential to the identified point and a value identifying a relative importance of precision to recall in the machine learning model. As discussed, the value identifying a relative importance of precision to recall in the machine learning model may be represented by the term $\beta$. Generally, $\beta$ may have a minimum value of 0, indicating that no weight is given to precision, and may have no defined maximum value, with increasing values of $\beta$ indicating that increasingly greater weights are assigned to precision over recall in the machine learning model.

In some aspects, the slope of the line tangential to the identified point may be equal to the negative of the identifying a relative importance of precision to recall in the machine learning model (e.g., the slope may be equal to $-\beta^2$).

In some aspects, because the analysis plot may be a curve with a monotonic characteristic (e.g., where values always increase or always decrease), a binary search can be performed to identify the point on the analysis plot associated with a desired accuracy metric (e.g., tradeoff between precision and recall) for the machine learning model. To do so, a midpoint on the curve may be initially selected, and the slope of the line tangential to this midpoint may be calculated. If the slope of the line tangential to the midpoint is greater than $-\beta^2$, the next round of analysis may be performed based on points associated with tangential lines having slopes less than that of the line tangential to the midpoint. Similarly, if the slope of the line tangential to the midpoint is less than $-\beta^2$, the next round of analysis may be performed based on points associated with tangential lines having slopes greater than that of the line tangential to the midpoint. This process may be performed repeatedly until the point on the analysis plot having a tangential line with a slope equal to $-\beta^2$ is identified.

At block 340, operations 300 proceed with configuring the machine learning model with a threshold value between the first classification and the second classification based at least in part on the identified point on the analysis plot.

In some aspects, the accuracy metric identified for the data set may be compared to accuracy metrics identified for other data sets for which inferences may be performed using the machine learning model. In some aspects, if an accuracy metric for the data set diverges by more than a threshold amount from accuracy metrics identified for other data sets for which inferences may be performed using the machine learning model, various actions may be taken to adjust the performance of the machine learning model for the data set and for other data sets. If the performance of the machine learning model for the data set is greater than performance of the machine learning model for the other data sets, the machine learning model may be retrained, or at least updated, to improve inference performance for the other data sets. In some aspects, updating the machine learning model for these other data sets may include adjusting a value of $\beta$ for these other data sets, training the machine learning model on additional samples of data from these other data sets, or the like.

Example Systems for Configuring Thresholds for Machine Learning Models

Figure 4:
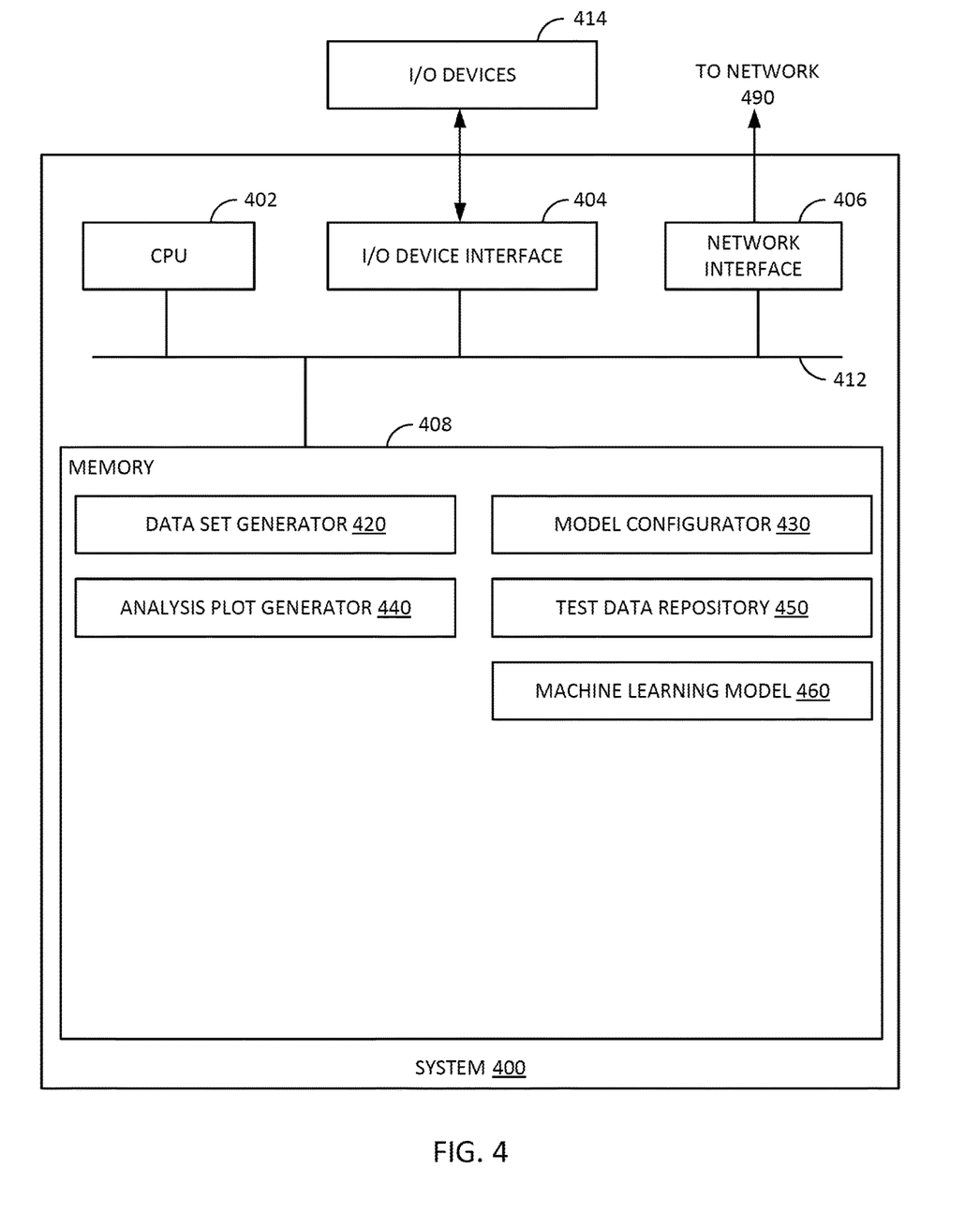
FIG. 4 illustrates an example system on which embodiments of the present disclosure can be performed.

FIG. 4 illustrates an example system 400 in which a machine learning model is configured with a threshold for classifying data into a plurality of classifications. System 400 may correspond to server 110 illustrated in FIG. 1.

As shown, system 400 includes a central processing unit (CPU) 402, one or more I/O device interfaces 404 that may allow for the connection of various I/O devices 414 (e.g., keyboards, displays, mouse devices, pen input, etc.) to the system 400, network interface 406 through which system 400 is connected to network 490 (which may be a local network, an intranet, the internet, or any other group of computing devices communicatively connected to each other), a memory 408, and an interconnect 412.

CPU 402 may retrieve and execute programming instructions stored in the memory 408. Similarly, the CPU 402 may retrieve and store application data residing in the memory 408. The interconnect 412 transmits programming instructions and application data, among the CPU 402, I/O device interface 404, network interface 406, and memory 408.

CPU 402 is included to be representative of a single CPU, multiple CPUs, a single CPU having multiple processing cores, and the like.

Memory 408 is representative of a volatile memory, such as a random access memory, or a nonvolatile memory, such as nonvolatile random access memory, phase change random access memory, or the like. As shown, memory 408 includes a data set generator 420, analysis plot generator 430, model configurator 440, test data repository 450, and machine learning model 460.

Data set generator 420 generally corresponds to data set generator 112 illustrated in FIG. 1. As discussed, data set generator 420 is configured to generate a sampled data set from an imbalanced source data set (e.g., retrieved from test data repository 450, which may correspond to test data repository 120 illustrated in FIG. 1). The source data set may include a first set of data corresponding to a first classification and a second set of data corresponding to a second classification, and the number of samples in the first data set may be significantly larger than the number of samples in the second data set. To allow for fast identification of a threshold between the first classification and the second classification, data set generator 420 generates a source data set that has a proportion of samples with the first classification to samples with the second classification that is smaller than the ratio of samples with the first classification in the source data set to samples with the second classification in the source data set. This may be performed by reducing the number of samples corresponding to the first classification and/or oversampling the second set of data corresponding to the second classification.

Analysis plot generator 430 generally corresponds to analysis plot generator 114 illustrated in FIG. 1. Generally, analysis plot generator 430 generates an analysis plot (e.g., analysis plot 200 illustrated in FIG. 2) based on various values of β, the sampled data set generated by data set generator 420, and machine learning model 460. The analysis plot generated by analysis plot generator 430 may be, in some aspects, a PRG curve or other curve illustrating a tradeoff between precision and recall for machine learning model 460, and the analysis plot may generally have a monotonic characteristic in which data points in the analysis plot always increase in value or always decrease in value. In some aspects, the analysis plot may be asymptotic, such that the slope of the analysis plot approaches ∞ if the data always increases in value or approaches −∞ if the data always decreases in value.

Model configurator 440 generally corresponds to model configurator 116 illustrated in FIG. 1. Generally, model configurator 440 attempts to identify a threshold for classifying data into a first classification or a second classification (e.g., for assigning a negative label or a positive label to an input) based on a value of β which defines a relative importance of precision and recall for the machine learning model. Model configurator 440 can identify a point on the analysis plot having a tangential line with a slope equal to $-\beta^2$ using a binary search and configure the machine learning model executing on various devices (e.g., via one or more messages transmitted to these devices via network 490) with a threshold value associated with the identifies point on the analysis plot. Model configurator 440 may also compare model performance across different data sets and configure machine learning model 460 differently for different data sets to attempt to improve the performance of the machine learning model for specific data sets for which inferences may be generated using machine learning model 460.

Note that FIG. 4 is just one example of a system, and other systems including fewer, additional, or alternative components are possible consistent with this disclosure.

Example Clauses

Implementation examples are described in the following numbered clauses:

Clause 1: A method, comprising: generating a randomly sampled data set from a data set including a first set of samples associated with a first classification and a second set of samples associated with a second classification, wherein a number of samples in the first set of samples is larger than a number of samples in the second set of samples; generating an analysis plot for a machine learning model based on the randomly sampled data set; identifying a point on the analysis plot associated with an accuracy metric for the machine learning model based on a slope of a line tangential to the identified point and a value identifying a relative importance of precision to recall in the machine learning model; and configuring the machine learning model with a threshold value between the first classification and the second classification based at least in part on the identified point on the analysis plot.

Clause 2: The method of Clause 1, wherein: generating the randomly sampled data set comprises reducing a number of samples associated with the first classification in the randomly sampled data set to a number smaller than the number of samples in the first set of samples, and a ratio of samples associated with the first classification to samples associated with the second classification in the randomly sampled data set is reduced to a defined ratio.

Clause 3: The method of any one of Clauses 1 or 2, wherein: generating the randomly sampled data set comprises randomly oversampling the second set of samples such that a number of samples in the randomly sampled data set associated with the second classification is greater than the number of samples in the second set of samples, and a ratio of samples associated with the first classification to samples associated with the second classification in the randomly sampled data set is reduced to a defined ratio.

Clause 4: The method of any one of Clauses 1 through 3, wherein a value of the slope of the line comprises a negative of a square of the value identifying the relative importance of precision to recall in the machine learning model.

Clause 5: The method of any one of Clauses 1 through 4, wherein the data set comprises a prediction score generated by a machine learning model and a ground-truth label associated with each sample in a database.

Clause 6: The method of any one of Clauses 1 through 5, wherein the analysis plot comprises a precision-recall-gain (PRG) curve.

Clause 7: The method of Clause 6, wherein the identified point is associated with an accuracy metric for the machine learning model when a threshold for assigning the first classification or the second classification to an input is set at the threshold value.

Clause 8: The method of any one of Clauses 1 through 7, further comprising comparing the accuracy metric for the machine learning model to another accuracy metric for the machine learning model generated based on another data set for which inferences are generated using the machine learning model.

Clause 9: The method of any one of Clauses 1 through 8, wherein the first classification comprises a negative classification for a defined task and the second classification comprises a positive classification for the defined task.

Clause 10: The method of Clause 9, wherein the negative classification is associated with legitimate activity within a computing system and the positive classification is associated with fraudulent activity within the computing system.

Clause 11: A system, comprising: a memory having executable instructions stored thereon; and a processor configured to execute the executable instructions to perform the methods of any one of Clauses 1 through 10.

Clause 12: A system, comprising: means for performing the methods of any one of Clauses 1 through 10.

Clause 13: A computer-readable medium having instructions stored thereon which, when executed by a processor, performs the methods of any one of Clauses 1 through 10.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
generating a randomly sampled data set from a data set including a first set of samples associated with a first classification and a second set of samples associated with a second classification, wherein a number of samples in the first set of samples is larger than a number of samples in the second set of samples, the first classification is associated with legitimate activity within a computing system, and the second classification is associated with fraudulent activity within the computing system;
generating an analysis plot for a machine learning model based on the randomly sampled data set;
identifying a point on the analysis plot associated with an accuracy metric for the machine learning model based on a slope of a line tangential to the identified point and a value identifying a relative importance of precision to recall in the machine learning model; and
configuring the machine learning model with a threshold value between the first classification and the second classification based at least in part on the identified point on the analysis plot.

2. The method of claim 1, wherein:
generating the randomly sampled data set comprises reducing a number of samples associated with the first classification in the randomly sampled data set to a number smaller than the number of samples in the first set of samples, and
a ratio of samples associated with the first classification to samples associated with the second classification in the randomly sampled data set is reduced to a defined ratio.

3. The method of claim 1, wherein:
generating the randomly sampled data set comprises randomly oversampling the second set of samples such that a number of samples in the randomly sampled data set associated with the second classification is greater than the number of samples in the second set of samples, and
a ratio of samples associated with the first classification to samples associated with the second classification in the randomly sampled data set is reduced to a defined ratio.

4. The method of claim 1, wherein a value of the slope of the line comprises a negative of a square of the value identifying the relative importance of precision to recall in the machine learning model.

5. The method of claim 1, wherein the data set comprises a prediction score generated by a machine learning model and a ground-truth label associated with each sample in a database.

6. The method of claim 1, wherein the analysis plot comprises a precision-recall-gain (PRG) curve.

7. The method of claim 6, wherein the identified point is associated with an accuracy metric for the machine learning model when a threshold for assigning the first classification or the second classification to an input is set at the threshold value.

8. The method of claim 1, further comprising comparing the accuracy metric for the machine learning model to another accuracy metric for the machine learning model generated based on another data set for which inferences are generated using the machine learning model.

9. The method of claim 1, wherein the first classification comprises a negative classification for a defined task and the second classification comprises a positive classification for the defined task.

10. A processing system, comprising:
a non-transitory memory having executable instructions stored thereon; and
a processor configured to execute the executable instructions in order to cause the processing system to:
generate a randomly sampled data set from a data set including a first set of samples associated with a first classification and a second set of samples associated with a second classification, wherein a number of samples in the first set of samples is larger than a number of samples in the second set of samples, the first classification is associated with legitimate activity within a computing system, and the second classification is associated with fraudulent activity within the computing system;
generate an analysis plot for a machine learning model based on the randomly sampled data set;
identify a point on the analysis plot associated with an accuracy metric for the machine learning model based on a slope of a line tangential to the identified point and a value identifying a relative importance of precision to recall in the machine learning model; and
configure the machine learning model with a threshold value between the first classification and the second classification based at least in part on the identified point on the analysis plot.

11. The processing system of claim 10, wherein:
in order to generate the randomly sampled data set, the processor is configured to cause the processing system to reduce a number of samples associated with the first classification in the randomly sampled data set to a number smaller than the number of samples in the first set of samples, and a ratio of samples associated with the first classification to samples associated with the second classification in the randomly sampled data set is reduced to a defined ratio.

12. The processing system of claim 10, wherein:

in order to generate the randomly sampled data set, the processor is configured to cause the processing system to randomly oversample the second set of samples such that a number of samples in the randomly sampled data set associated with the second classification is greater than the number of samples in the second set of samples, and a ratio of samples associated with the first classification to samples associated with the second classification in the randomly sampled data set is reduced to a defined ratio.

13. The processing system of claim 10, wherein a value of the slope of the line comprises a negative of a square of the value identifying the relative importance of precision to recall in the machine learning model.

14. The processing system of claim 10, wherein the data set comprises a prediction score generated by a machine learning model and a ground-truth label associated with each sample in a database.

15. The processing system of claim 10, wherein the analysis plot comprises a precision-recall-gain (PRG) curve.

16. The processing system of claim 15, wherein the identified point is associated with an accuracy metric for the machine learning model when a threshold for assigning the first classification or the second classification to an input is set at the threshold value.

17. The processing system of claim 10, wherein the processor is further configured to cause the processing system to compare the accuracy metric for the machine learning model to another accuracy metric for the machine learning model generated based on another data set for which inferences are generated using the machine learning model.

18. The processing system of claim 10, wherein the first classification comprises a negative classification for a defined task and the second classification comprises a positive classification for the defined task.

19. A method, comprising:

generating a randomly sampled data set from a data set including a first set of samples associated with a first classification and a second set of samples associated with a second classification, wherein a number of samples in the first set of samples is larger than a number of samples in the second set of samples, the first classification is associated with legitimate activity within a computing system, and the second classification is associated with fraudulent activity within the computing system;

generating an analysis plot for a machine learning model based on the randomly sampled data set;

identifying a point on the analysis plot associated with an accuracy metric for the machine learning model based on a slope of a line tangential to the identified point and a value identifying a relative importance of precision to recall in the machine learning model;

comparing the accuracy metric for the machine learning model to another accuracy metric for the machine learning model generated based on another data set for which inferences are generated using the machine learning model; and configuring the machine learning model with a threshold value between the first classification and the second classification based at least in part on the identified point on the analysis plot and the comparison of the accuracy metric for the machine learning model to the other accuracy metric.

\* \* \* \* \*